United States Patent Office 2,802,805
Patented Aug. 13, 1957

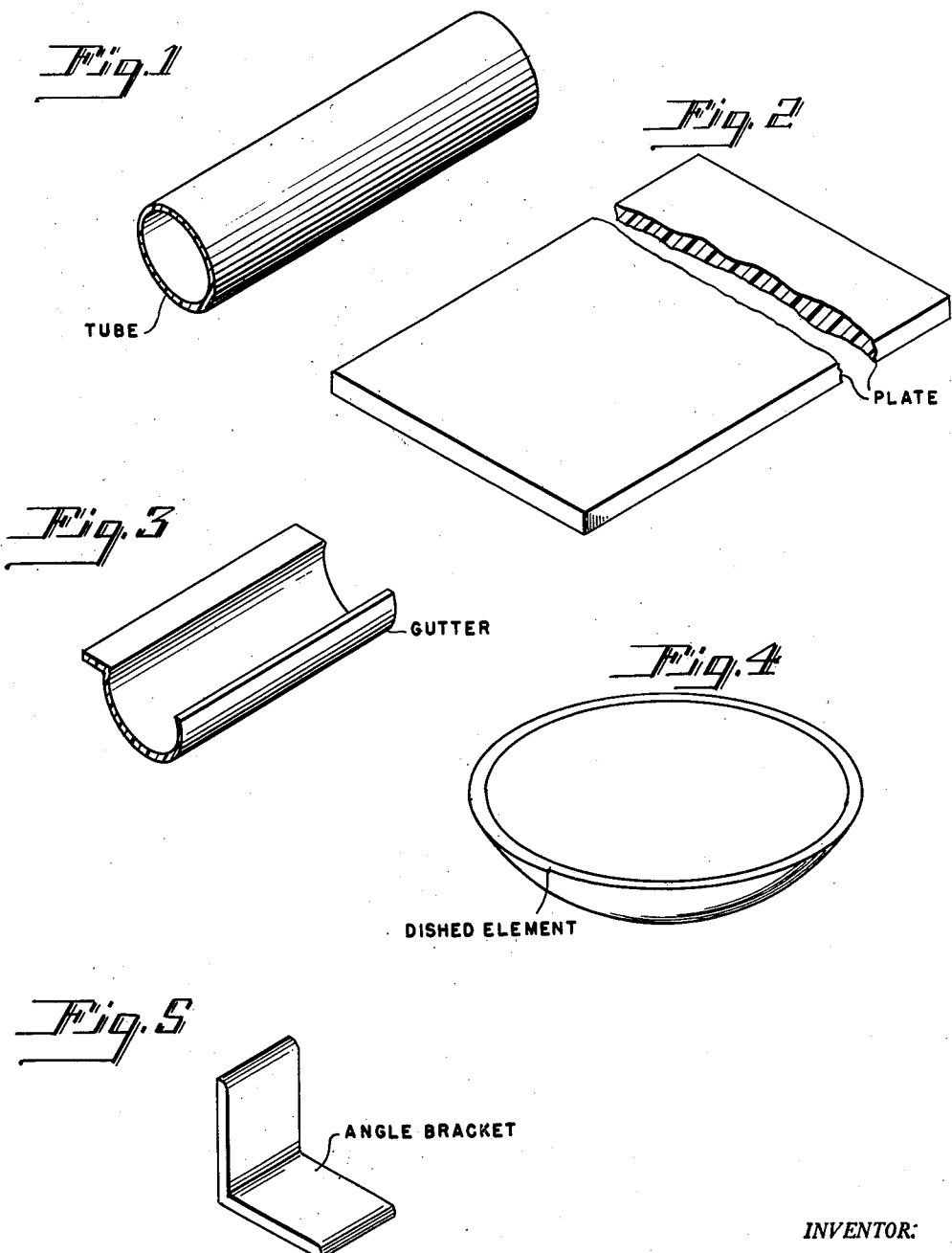

2,802,805

SHAPED CONSTRUCTIONAL MEMBERS FOR INDUSTRIAL USE

Karl Dietz, Kronberg, Germany, assignor to Farbwerke Hoechst Aktiengesellschaft vormals Meister Lucius und Brüning, Frankfurt am Main-Hochst, Germany, a company of Germany Application August 21, 1952, Serial No. 305,568

Claims priority, application Germany August 24, 1951

2 Claims. (Cl. 260—38)

The present invention relates to shaped constructional members for industrial use which consist of masses containing xylenol-formaldehyde resin. As such shaped members there may be mentioned, for instance tubes, plates, gutters, dished members and angle brackets to be fitted into the corners of containers, which elements are used in a great variety of forms in industry.

I have found that, for the manufacture of such shaped constructional members masses are preferably used which—according to their application—contain, besides the mentioned resins, additions such as chlorhydrins. As chlorhydrins there come primarily into consideration: epichlorhydrin, glycolchlorhydrin, the dichlorpropanols $CH_2Cl—CH(OH)—CH_2Cl$, $CH_2(OH)—CHCl—CH_2Cl$ and the monochlorpropanols $CH_2(OH)—CH(OH)—CH_2Cl$,
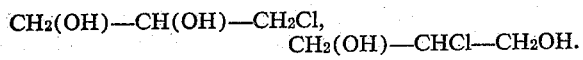
$CH_2(OH)—CHCl—CH_2OH$.

Mixtures of chlorhydrins can also be applied.

The total quantity of these additions preferably amounts to about 5 percent by weight to about 15 percent by weight, calculated on the quantity of the xylenol-formaldehyde resin used. In general, additions of about 10 percent by weight are of particular advantage. In some cases however, quantities can also be used which are outside of the mentioned limits of 5 percent and 15 percent.

Of the chlorhydrins in question epichlorhydrin and glycolchlorhydrin have proved to be most important for practical use. Shaped constructional members for industrial use prepared of xylenol-formaldehyde resin masses which also contain epichlorhydrin and/or glycolchlorhydrin are particularly advantageous in view of their high resistance against a great number of chemical substances.

Instead of, or in addition to, chlorhydrins, chlorinated aldehydes, such as, for example, chloral hydrate and chlorobenzaldehyde can also be used. As further additives which are used in addition to, or also instead of, the chlorhydrins or chlorinated aldehydes, there are concerned, for example, alkyl phosphates, such as trimethyl phosphate and triethyl phosphate.

In some cases the application of hardening agents is advisable; as hardening agents there come into consideration, for example: sodium bisulphate, phosphoric acid, metallic oxides which show a neutral reaction in the presence of water, such as lead dioxide or manganese dioxide, and also acid or neutral persulphates, titanium sulphate, aromatic sulphochlorides, such as benzene sulphochloride, para-toluene sulphochloride, beta-naphthalene sulphochloride or naphthylene disulphodichloride and also naphthalene disulphonic acids, especially 1:5-naphthalene disulphonic acid, furthermore aliphatic esters, for example alkyl sulphates, such as diethyl sulphate and dipropyl sulphate. The quantities by weight of the added hardening agents amount in general to about 0.5 percent to about 5 percent, calculated upon the quantity of the resin.

The addition of fillers of known kind has proved to be suitable. The kind and the quantity of the filler have to be chosen according to the shaped constructional member to be produced. For example, there come into consideration, besides natural or artificial graphite, especially silicon carbide and talcum, but also barium sulphate, quartz powder, and the other known fillers. The quantities by weight of the fillers amount in general to about 1 to about 3 times the quantity of the resin.

The shaped constructional members according to the present invention are distinguished by a very good resistance to acid, alkaline and also oxidizing influences, which make themselves felt especially in modern bleaching processes, and also against organic compounds, especially aliphatic and aromatic hydrocarbons, for example benzine or benzene, furthermore against aniline, pyridine, chlorinated hydrocarbons, alcohol, or esters. By using a filler of particularly good thermal conductivity as, for example, silicon carbide or graphite of natural or synthetic orgin, the shaped members obtained also possess an excellent thermal conductivity.

For preparing the shaped constructional members, the masses can be hardened in different ways according to their composition. In many cases a heat treatment will be sufficient. If, however, masses containing hardening agents are used, no heat treatment will be necessary in general. But also in the latter case an additional treatment with heat may be useful for the hardening process.

From such masses containing xylenol-formaldehyde resin the bodies of desired shape can be manufactured in different ways.

In particular it has been found that such xylenol-formaldehyde resin masses can be processed by pressing to form constructional members of the most varied kinds, which can advantageously be used for a great variety of purposes in the chemical industry for the manufacture of apparatus parts on account of their great stability to attacks by chemical substances and their good thermal conductivity.

The shaped members according to the invention may, for example, be manufactured from the xylenol-formaldehyde resin masses by means of an injection moulding device (hose), i. e. an extrusion press or a screw press.

It has been found, and this is surprising, that by moulding such xylenol-formaldehyde resin masses, especially when simultaneously applying heat, the xylenol-formaldehyde resins have a thermoplastic character in contradistinction to the rapidly hardening phenol- or cresol-formaldehyde resins. Consequently, the moulding of such masses can be carried out within a relatively long period of time even when applying heat and pressure, and the cooled shaped bodies, even complicated structures, for instance thin-walled tubes of large diameter, are so stable that they can be transported without difficulty to a heating chamber for final hardening or heat treatment.

As starting materials for the xylenol-formaldehyde resins used in the preparation of the masses for the shaped constructional members, all the xylenols come into consideration which can be condensed with formaldehyde, as, for example, 1-hydroxy-2:3-dimethylbenzene, 1-hydroxy-2:6 - dimethylbenzene, and 1 - hydroxy - 2:5 - dimethylbenzene. Most suitable are crude xylenols which consist of a mixture of different xylenols.

The addition of thermoplastic resins as, for example, polyvinyl chloride or polystyrene, to the xylenol-formaldehyde resins has proved to be of particular advantage in some cases. The proportions of the xylenol-formaldehyde resin and the other resins can vary within wide limits. It is advantageous to use xylenol-formaldehyde resin and polyvinyl chloride or polystyrene in a proportion by weight ranging from about 4:1 to about 10:1.

The following examples serve to illustrate the invention, but they are not intended to limit it thereto, the parts being by weight:

Example 1

270 parts of xylenol-formaldehyde resin, which has a viscosity of 10,000 centipoises at 20° C., are mixed with 30 parts of epichlorhydrin and 300 parts of graphite. The graphite portion may consist of flake graphite or a mixture of flake graphite and artificial graphite. The mass is moulded to shaped bodies in a hot press or to tubes in an extrusion press or screw press. The temperature on the hot press is between 140° C. and 160° C. at a pressure of between 100 and 200 kilograms per square centimeter. The temperature on the extrusion press or the screw press amounts to 100° to 105° C. The hardening of the moulded material takes place by an after-treatment at temperatures between 120° C. and 160° C.

Example 2

270 parts of xylenol-formaldehyde resin, which has a viscosity of 10-20,000 centipoises at 20° C., are mixed with 15 parts of epichlorhydrin, 15 parts of glycol chlorhydrin and 300 parts of graphite. The mixture is finally mixed with 6 parts of phosphoric acid of 75 percent strength or with 2 parts of 1:5-naphthalene disulphonic acid. The processing of the mass takes place as described in Example 1.

Example 3

270 parts of xylenol-formaldehyde resin, which has a viscosity of 5,000 centipoises at 20° C., are mixed with 30 parts of epichlorhydrin, 400 parts of graphite and 50 parts of polystyrene. The processing of the mass so obtained is carried out as described in Example 1. Instead of epichlorhydrin there may be used trimethyl phosphate or triethyl phosphate.

I claim:

1. A process of manufacturing shaped constructional members for industrial use which process comprises molding in a hot press a mixture consisting essentially of xylenol-formaldehyde resin, 1 to 3 times as much of a mineral filler as xylenol-formaldehyde resin at least one polymerized thermoplastic compound selected from the group consisting of polyvinyl chloride and polystyrene, the ratio of xylenol resin:polymerized compound ranging from about 4:1 to about 10:1, and from about 5% to 15% of at least one compound selected from the group consisting of epichlorhydrin, glycolchlorhydrin, monochloropropanol, dichloropropanol, chloral hydrate and chlorobenzaldehyde.

2. Shaped constructional members for industrial use obtained by molding in a hot press masses consisting essentially of xylenol-formaldehyde resin, 1 to 3 times as much of a mineral filler as xylenol-formaldehyde resin, at least one polymerized thermoplastic compound selected from the group consisting of polyvinyl chloride and polystyrene, the ratio of xylenol resin-polymerized compound ranging from about 4:1 to about 10:1, and from about 5% to 15% of at least one compound selected from the group consisting of epichlorhydrin, glycolchlorhydrin, monochloropropanol, dichloropropanol, chloral hydrate and chlorobenzaldehyde.

References Cited in the file of this patent

UNITED STATES PATENTS

| | | |
|---|---|---|
| 2,054,053 | Hoffman | Sept. 8, 1936 |
| 2,437,284 | Watson | Mar. 9, 1948 |
| 2,658,885 | D'Alelio | Nov. 10, 1953 |
| 2,673,190 | Dietz | Mar. 23, 1954 |

FOREIGN PATENTS

| | | |
|---|---|---|
| 502,433 | Belgium | Apr. 30, 1951 |

OTHER REFERENCES

Handbook of Chemistry, by Lang, 8th edition, pages 700–701.

Chemistry of Synthetic Resins, by Ellis, volume 2, pages 1324–25, published 1935 by Reinhold Publishing Co.

Chemistry of Synethic Resins, by Ellis, volume 1, page 366, published 1935 by Reinhold Publishing Co.

The Chemistry and Technology of Plastics, by Nauth, published 1947 by Reinhold Publishing Corp., pages 19, 22, 25 and 26.